(12) United States Patent
Bozga et al.

(10) Patent No.: US 9,930,006 B2
(45) Date of Patent: Mar. 27, 2018

(54) METHOD FOR ASSIGNING LOGICAL ADDRESSES TO THE CONNECTION PORTS OF DEVICES OF A SERVER CLUSTER, AND CORRESPONDING COMPUTER PROGRAM AND SERVER CLUSTER

(75) Inventors: Liana Bozga, Meylan (FR); Johann Peyrard, Saint Ismier (FR); Thierry Missimilly, Kaulnaveys le haut (FR)

(73) Assignee: BULL SAS, Les Clayes-Sous-Bois (FR)

( * ) Notice: Subject to any disclaimer, the term of this patent is extended or adjusted under 35 U.S.C. 154(b) by 537 days.

(21) Appl. No.: 14/129,023

(22) PCT Filed: Jun. 20, 2012

(86) PCT No.: PCT/FR2012/051389
§ 371 (c)(1),
(2), (4) Date: Dec. 23, 2013

(87) PCT Pub. No.: WO2013/001208
PCT Pub. Date: Jan. 3, 2013

(65) Prior Publication Data
US 2014/0122671 A1    May 1, 2014

(30) Foreign Application Priority Data

Jun. 29, 2011  (FR) ...................... 11 55841

(51) Int. Cl.
*G06F 15/177* (2006.01)
*H04L 29/12* (2006.01)
*H04L 12/24* (2006.01)

(52) U.S. Cl.
CPC .......... *H04L 61/20* (2013.01); *H04L 41/0806* (2013.01); *H04L 41/0889* (2013.01); *H04L 41/0893* (2013.01); *H04L 61/2007* (2013.01)

(58) Field of Classification Search
CPC ............... H04L 29/12047; H04L 61/15; H04L 29/12216; H04L 41/0213; H04L 43/0817;
(Continued)

(56) References Cited

U.S. PATENT DOCUMENTS 6,760,761 B1   7/2004 Sciacca
6,847,993 B1 *  1/2005 Novaes ................. G06F 9/5061
370/216

(Continued)

FOREIGN PATENT DOCUMENTS

FR      2 931 970 B2   12/2009
WO   WO 2009/153498 A1   12/2009

OTHER PUBLICATIONS

International Search Report for PCT/FR2012/051389 dated Aug. 27, 2012.

*Primary Examiner* — Dustin Nguyen
*Assistant Examiner* — Hao Nguyen
(74) *Attorney, Agent, or Firm* — Pillsbury Winthrop Shaw Pittman LLP

(57) ABSTRACT

A method and system for assigning logical addresses to connection ports of devices of a server cluster. The method includes defining a logical addressing policy in respect of said connection ports of devices of the cluster; based on a logical distribution of the devices of the cluster in the data transmission network, a geographic distribution, and a hardware definition of the devices of the cluster, initializing a server cluster administration database; according to the logical addressing policy, assigning logical addresses to the connection ports of devices of the server cluster; and saving the logical addresses assigned in the server cluster administration database. The system includes an automatic logical (Continued)

Figure 1:
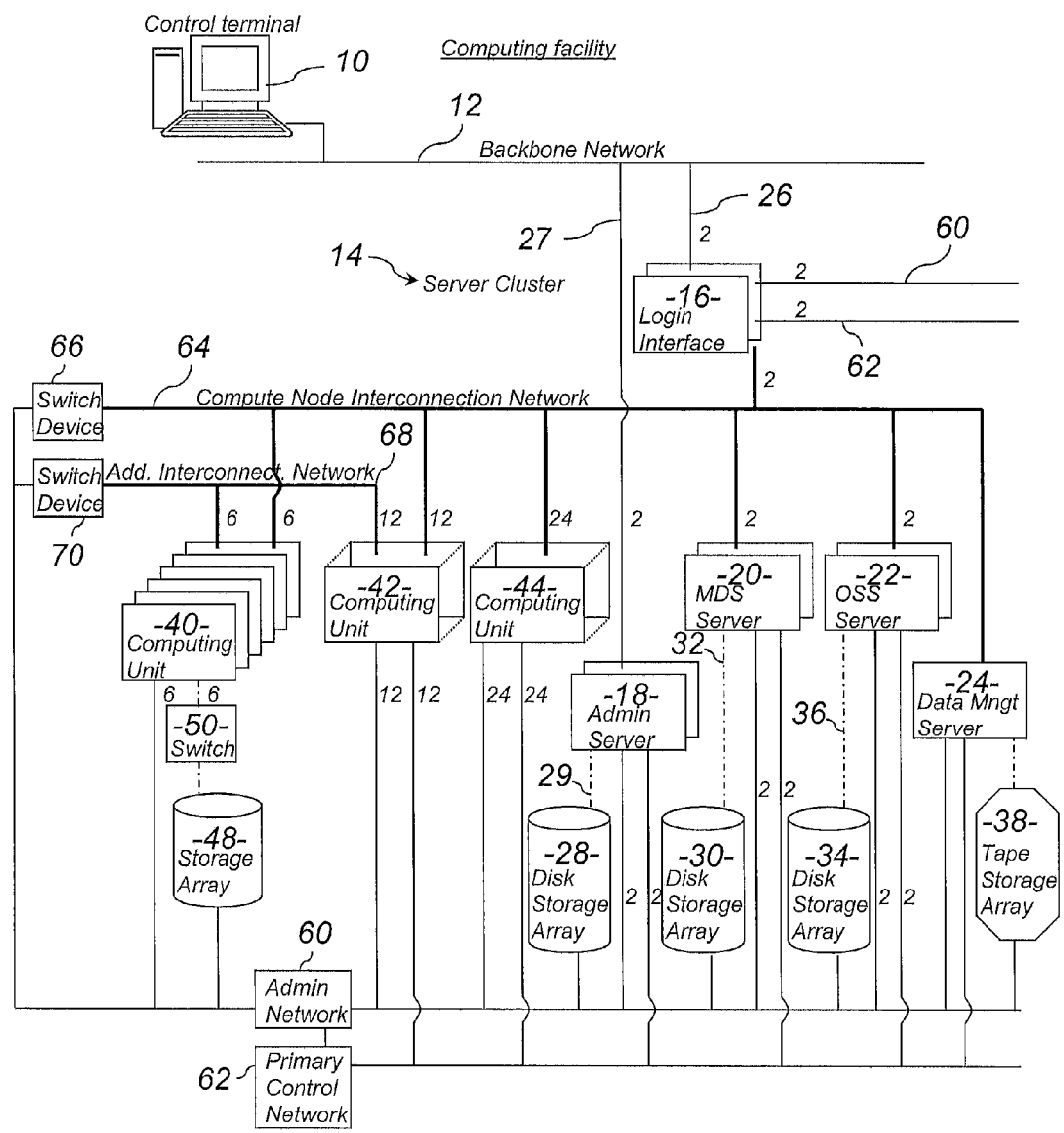

address allocator configured to perform these functions based on execution settings of a structured description file of the logical addressing policy and the content of a previously initialized administration database.

20 Claims, 2 Drawing Sheets

(58) Field of Classification Search
CPC ............... H04L 61/2007; H04L 67/303; H04L 41/0889; H04L 41/0806; H04L 41/0893; H04L 61/20; H04L 41/0886; H04L 61/103; G06F 12/0292; G06F 12/1009; G06F 17/30289; G06F 17/30336; G06F 2212/7201; G06F 3/0647
USPC ....... 709/208, 220, 221, 222, 225, 242, 245, 709/247; 711/5, 103, 112, 162, 173
See application file for complete search history.

(56) References Cited

U.S. PATENT DOCUMENTS

| | | | |
|---|---|---|---|
| 7,865,617 B1* | 1/2011 | Pulleyn | H04L 29/12047 709/225 |
| 2003/0115303 A1* | 6/2003 | Marian | H04L 29/1232 709/222 |
| 2005/0234954 A1* | 10/2005 | Bailey | G06F 9/544 |
| 2006/0165095 A1* | 7/2006 | Samprathi | H04L 43/0817 370/395.53 |
| 2006/0282641 A1* | 12/2006 | Fujimoto | G06F 3/0608 711/173 |
| 2007/0294307 A1 | 12/2007 | Chen et al. | |
| 2009/0157940 A1* | 6/2009 | Sanvido | G06F 3/0611 711/5 |
| 2010/0115070 A1* | 5/2010 | Missimilly | G06F 17/30289 709/222 |
| 2012/0215874 A1* | 8/2012 | Sequeira | H04L 12/12 709/208 |
| 2015/0067233 A1* | 3/2015 | Cheng | G06F 12/0246 711/103 |

* cited by examiner

METHOD FOR ASSIGNING LOGICAL ADDRESSES TO THE CONNECTION PORTS OF DEVICES OF A SERVER CLUSTER, AND CORRESPONDING COMPUTER PROGRAM AND SERVER CLUSTER

The present invention relates to a method for assigning logical addresses to connection ports of devices of a server cluster. It also relates to a computer program for implementing this method and a server cluster.

Server clusters particularly comprising a plurality of interconnected compute nodes are known. Such server clusters are computing facilities generally comprising a plurality of networked computers, with shared storage, externally viewed as a computer with a very high computing power, or HPC ("High Performance Computing") computer. These optimised facilities are suitable for distributing complex processes and/or parallel data processing on at least a portion of the compute nodes.

Some of the more basic server clusters may comprise homogeneous devices observing the same identification protocols, such that these elements may be identified automatically on switching on the facility, for proper start-up and administration of the server cluster. Unfortunately, this is not the case of most of the complex server clusters currently in existence, with very high computing capabilities, for which it is necessary to generate a database containing all the heterogeneous devices and the settings of the server cluster. This database is thus the sole reference for the server cluster configuration and status.

The term devices of a server cluster denotes the aforementioned nodes, but also switches, data storage arrays, hardware managers, administrable electrical power supplies, or more generally any elements suitable for interconnection using connection ports requiring a logical address, particularly an IP address, to function. In this way, for example, for a server cluster having 5,000 nodes, about 15,000 logical addresses are generally required.

One major difficulty consists of entering all the information required for server cluster administration into this database, this data particularly comprising the logical addresses to be assigned to the connection ports of the devices of the server cluster. The minimum information required further comprises static logical and hardware description data of the devices of the server cluster and the relationships thereof such as for example a description of the hardware, a geographic location of the servers and devices of the cluster in a computing centre, a status of the software tools installed, the cluster operating data, or a status of the hardware.

To feed the database, frequently defined in the form of a relational database, handling queries of the database are generally defined. By default, they are written manually in the form of code lines compiled into one or a plurality of files, of up to several thousand lines for complex sever clusters. Studying the technical documents defining a server cluster, including the cluster architecture and wiring, and writing these database handling queries may take several months. Furthermore, the writing process is generally not structured in a predefined order, making it even more difficult and time-consuming. Finally, the manual writing of handling queries gives rise to input error and requires multiple consistency checks.

The French patent published under the number FR 2 931 970 B1 discloses a method for solving this problem by automating the generation of at least one handling query file for the administration database of a server cluster for the initialisation thereof.

This method comprises, among others, the following steps:
    defining a logical addressing policy in respect of connection ports of devices of the cluster,
    based on a logical distribution of the devices of the cluster in the data transmission network, a geographic distribution and a hardware definition of the devices of the cluster, initialising a server cluster administration database,
    further according to the logical addressing policy, assigning logical addresses to said connection ports of devices of the server cluster, and
    saving the logical addresses assigned in the server cluster administration database.

More specifically, according to this method, the logical addresses are assigned to the connection ports of devices of the server cluster and saved when the administration database is initialised. In this way, this initialisation is performed not only based on the logical distribution, the geographic distribution and the hardware definition of the devices of the cluster, but also according to the logical addressing policy. In fact, this method makes use of the definition of an addressing policy in respect of the connection ports of the devices of the server cluster for structuring the steps for generating a set of cluster settings which, after applying the addressing policy to the connection ports of the devices of the server cluster, makes it possible to envisage easier generation of a database handling query file for the initialisation thereof.

However, this solution is not suitable for server clusters wherein the performances can now be up to and in excess of one petaflops (i.e. the capability to perform $10^{15}$ floating points operations per second (or "flops")). Indeed, in view of the size of these clusters, the logical networks may be excessively complex with network isolation and security mechanisms, the definition of the logical addressing policy not being suitable for simple expression.

Furthermore, in a server cluster design process by a vendor followed by the installation of the server cluster on a user site, the administration database is initialised before the delivery of the server cluster. However, the addressing policy is generally specifically and advantageously defined by the user whereas the method according to the patent FR 2 931 970 B1 requires it to be previously available before the database initialisation step. To overcome this contradiction, the solution offered requires a rigidity whereby the logical addressing policy is defined upstream and without any flexibility for the user.

It may thus be sought to envisage a method for assigning logical addresses to connection ports of devices of a server cluster suitable for doing away with at least some of the aforementioned problems and constraints.

The invention thus relates to such a method comprising the following steps:
    defining a logical addressing policy in respect of said connection ports of devices of the cluster,
    based on a logical distribution of the devices of the cluster in the data transmission network, a geographic distribution and a hardware definition of the devices of the cluster, initialising a server cluster administration database,
    further according to the logical addressing policy, assigning logical addresses to said connection ports of devices of the server cluster, and saving the logical addresses assigned in the server cluster administration database, characterised in that it comprises the execution of an automatic logical address allocator based on execution settings comprising:

a structured description file of the logical addressing policy, and the content of the previously initialised administration database.

In this way, the logical addresses are allocated after the prior initialisation of the server cluster administration database, giving the end user more freedom to define, or even redefine, him/herself, and optionally in complete confidentiality, the logical addressing policy. Furthermore, by defining same in a structured description file, it is possible to envisage a complex logical network configuration for operational logical address allocation on very high-performance server clusters, in the region of one petaflops and above, implying approximately 5,000 or more nodes. Finally, since the administration database is initialised before allocating the logical addresses, the content thereof is suitable for processing for high-performance automatic allocation.

Optionally, the structured description file of the logical addressing policy comprises a tree structure of logical networks and of logical address ranges in these networks.

In particular, the tree structure may be defined in XML format.

Also optionally, the tree structure comprises:

at a first root level corresponding to the "physical" layer of the OSI Open Systems Interconnection model, a description of physical networks of the server cluster, at a second level corresponding to the "data link" and "network" layers of the OSI Open Systems Interconnection model, a description of the logical networks of the server cluster, at a third level, a description of the division of these logical networks into logical address ranges, and at a fourth level, a class description of the devices of the server cluster and the associated logical address ranges thereof.

Also optionally, the execution of the automatic logical address allocator comprises the following two steps:

configuration of the logical networks and generation of a command file comprising instructions for allocating logical addresses to connection ports of devices of the server cluster, these instructions being expressed in database management language, and command file execution based on the previously initialised administration database.

Also optionally, the step for configuring the logical networks in the execution of the automatic logical address allocator comprises a loop check on all the connection ports to be allocated in respect of the consistency of the addressing policy defined in the structured description file with a physical server cluster structure.

Also optionally, the logical addresses are IP addresses.

The invention also relates to a computer program downloadable from a communication network and/or saved on a computer-readable medium and/or executable by a processor, characterised in that it comprises instructions for executing steps of a method for assigning logical addresses as defined above, when said program is executed on a computer.

The invention also relates to a server cluster comprising a plurality of nodes interconnected together by at least one data transmission network, including at least one cluster node administration server, for example associated with an administration data storage array, characterised in that it further comprises an administration database initialised and completed by means of a method as defined above, the administration data being for example stored in the administration data storage array and the administration server comprising means for managing the database, including the automatic logical address allocator.

Optionally, a server cluster according to the invention may comprise compute nodes, at least one node carrying out a function for managing traffic in respect of the data processed by the compute nodes and optionally at least one data management node, and the data transmission network may comprise at least one compute node interconnection network and at least one administration network different to the compute node interconnection network for connecting the administration server to the compute nodes, for managing the data traffic processed by the compute notes and managing data.

Figure 2:
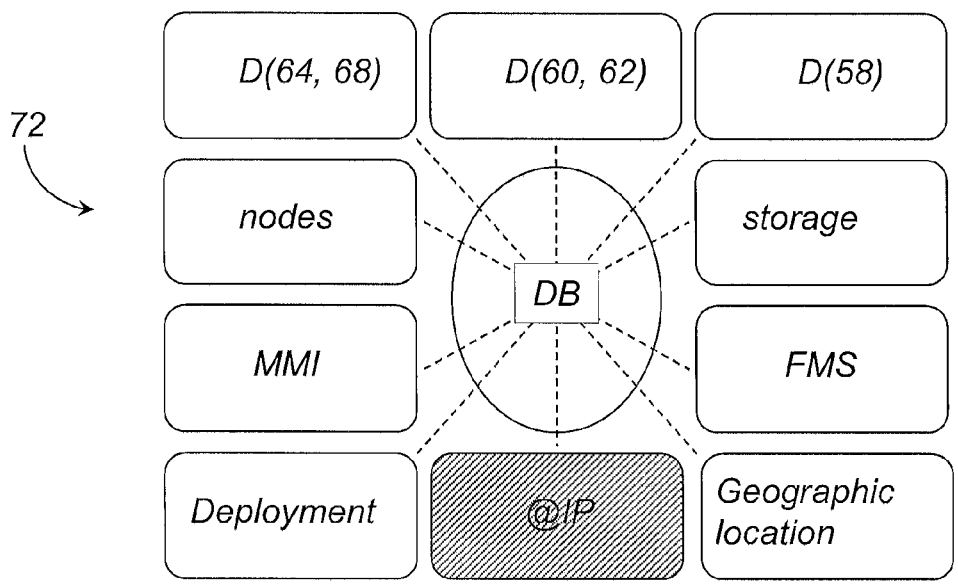
Figure 3:
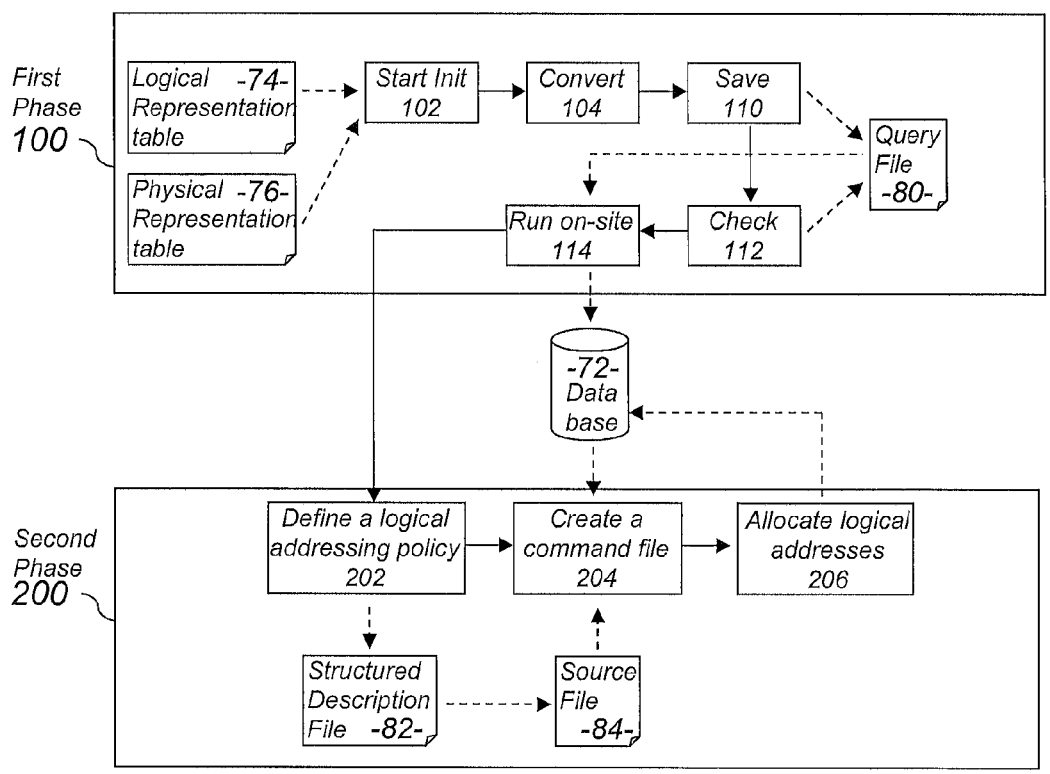

The invention will be understood more clearly using the description hereinafter, given merely as an example, with reference to the appended figures wherein:

FIG. 1 schematically represents the general structure of an example of an HPC computer type server cluster, FIG. 2 schematically represents the configuration of a database for administering the server cluster in FIG. 1, FIG. 3 illustrates the successive steps of a method for assigning logical addresses to at least a portion of the nodes of the server cluster in FIG. 1.

The computing facility represented in FIG. 1 comprises a control terminal 10 connected to a backbone network 12. This backbone network 12 is also connected to a server cluster 14 viewed externally, i.e. from the point of view of the control terminal 10, as a single HPC computer entity.

In fact, the server cluster 14 comprises a plurality of computers interconnected to each other via a plurality of networks, which are heterogeneous in relation to each other.

The set of computers in the server cluster 14 represents the set of nodes in this cluster. More generally, a node is a computer suitable for comprising one or a plurality of computing unit(s).

In the server cluster 14, a distinction may be made between two types of nodes: compute nodes and service nodes. Compute nodes are those actually executing the various processing instructions ordered from the control terminal 10, under the supervision of the service nodes.

Most of the service nodes are duplicated for security reasons. In other words, each service node is associated with a replicate comprising the same characteristics and ready to replace same immediately in the event of a fault.

Moreover, it should be noted that in FIG. 1, whenever there are multiple links between two entities (nodes and/or network portions), only one link will be shown and accompanied by a number indicating the number of links between the two entities, for the purposes of clarity in this figure. Indeed, if each link were to be shown, due to the complexity of the server cluster 14, this would give rise to confusion impeding the comprehension of the invention.

The set of service nodes of the server cluster 14 in FIG. 1 comprises a processing interface 16, an administration server 18, a cluster metadata management server 20, an input/output management server 22 and a data management server 24.

The processing interface 16, more commonly known as the Login interface, acts as a computing interface between the backbone network 12 and the server cluster 14. In principle, it is of the same type as the compute nodes but is further provided with compilers and specific computing tools required on this interface to process the instructions received from the control terminal 10. The processing interface 16 is duplicated, as mentioned above for security reasons, and is thus connected, with the replicate thereof, to the backbone network 12 via two links 26.

The administration server 18 performs a general administration function in respect of the server cluster 14. It particularly handles the distribution of the instructions transmitted by the processing interface 16 to the various compute nodes according to the nature and availability thereof. It is also duplicated for security reasons. The administration server 18 and the replicate thereof share a disk storage array 28 to which they are connected via a plurality of optical fibres 29, for high-speed access to the stored data.

To enable the administration of the server cluster 14 by a user of the control terminal 10, the administration server 18 is generally also directly connected to the backbone network 12 with the replicate thereof via two links 27. This further enables a user of the control terminal 10 to have more control over the computing strategy and options selected by the server cluster 14. Moreover, in some embodiments of small server clusters with no Login interface, this dual link 27 is the only link between the server cluster and the backbone network.

The metadata management server 20, also known as the MDS server ("Meta Data Server") and the input/output management server 22, also known as the OSS server ("Object Storage Server") perform a traffic management function in respect of the data processed by the compute nodes of the server cluster 14. For this, they manage a distributed file management system, for example the Lustre system (registered trademark).

These two servers are also duplicated and are each connected to a storage array via optical fibres. The MDS server 20 and the replicate thereof share a disk storage array 30 to which they are connected via a plurality of optical fibres 32. Similarly, the OSS server 22 and the replicate thereof share a disk storage array 34 to which they are connected via a plurality of optical fibres 36.

Finally, the data management server 24 handles data protection for the entire HPC computer and, for this purpose, is connected to a tape storage array 38. This data management server 24, unlike the other service nodes in the server cluster 14, is not duplicated in the example illustrated in FIG. 1.

The set of compute nodes of the HPC computer in FIG. 1 is heterogeneous and comprises a plurality of compute nodes such as for example a first computing unit 40 comprising six servers, a second computing unit 42 comprising twelve servers and a third computing unit 44 comprising twenty-four servers.

The six servers of the first computing unit 40 share a specific storage array 48 to which they are connected via a switch 50. This storage array 48 gives access to data volumes which are for example organised according to their own file management system, which may be different to that managed by the MDS 20 and OSS 22 servers.

The various nodes in the aforementioned server cluster 14 are interconnected together using a plurality of networks.

A first network 60, referred to as the administration network, generally of the Ethernet type, is used to connect the administration server 18 of the server cluster 14, via an administration port of this server, to the other nodes in the cluster such as the processing interface 16, the MDS server 20, the replicate thereof and the storage array 30 thereof, the OSS server 22, the replicate thereof and the storage array 34 thereof, the data management server 24 and the tape storage array 38 thereof, the first, second and third computing units 40, 42 and 44, the specific storage array 48 of the first computing unit 40 and the administration platform 52.

Optionally, according to the hardware used for the computer server nodes, the administration network 60 may be duplicated with a primary control network 62 connected to the administration server 18 via a primary control port of the server, different to the administration port. This primary control network 62 is dedicated for power-up, start-up, shutdown and for processing some predefined primary errors, referred to as fatal errors and generating Core files, of the servers administered. In the example in FIG. 1, the primary control network 62 connects the administration server 18 to the processing interface 16 and to the replicate thereof, to the MDS 20 and to the replicate thereof, to the OSS server 22 and to the replicate thereof, to the data management server 24, and to the second and third computing units 42 and 44.

A second network 64, referred to as the compute note interconnection network, interconnects, on one hand, the servers of the first, second and third computing units 40, 42 and 44, and, on the other, the processing interface 16, the MDS server 20, the OSS server 22 and the data management server 24. The data transiting between the various elements interconnected by this interconnection network 64 is switched by a switching device 66 of this network which is in turn connected to the administration network 60. This interconnection network 64 has very high speed characteristics in relation to the speed characteristics of the administration network 60. Indeed, the computing data required to execute the processing instructions transmitted by the control terminal 10, via the processing interface 16, transits through this interconnection network 64.

Optionally, the interconnection network 64 may be duplicated with an additional interconnection network 68 connected to at least some of the elements already interconnected via the interconnection network 64. For example, in the server cluster 14 in FIG. 1, the additional interconnection network 68 connects the servers of the first and second computing units 40 and 42 to double the bandwidth thereof. Similarly, the data transiting between the various elements interconnected by this additional interconnection network 68 is switched by an additional switching device 70 of this network which is in turn connected to the administration network 60.

The structure of the server cluster 14, as described above with reference to FIG. 1, is suitable for implementing the invention, but other possible cluster configurations, particularly of the HPC computer type, comprising all or part of the aforementioned elements, or even comprising further elements in the event of greater complexity, are also suitable. In a simple configuration, a server cluster comprises service nodes comprising at least one administration server, compute nodes, an administration network connecting the administration node to the other nodes of the cluster and a compute node interconnection network wherein the higher speed than that of the administration network makes it possible to obtain high computing performances. More generally, a server cluster further comprises switches, storage arrays, hardware managers, power supplies, or any other elements suitable for being interconnected using connection ports requiring a logical address, particularly an IP address, to operate and acting as the set of devices thereof.

Such a server cluster 14, consisting of very heterogeneous elements, requires an initialisation and administration database 72, wherein the administration tools are for example hosted by the administration server 18 and wherein the description data is stored in the storage array 28 associated with the administration server 18. The static or dynamic data of the database 72 is backed up regularly in the tape storage array 38. This database 72 is shown schematically in FIG. 2.

It comprises a database core DB, particularly including the administration tools thereof, and structured description data (D(58), D(60,62), D(64,68), nodes, MMI, Deployment, @IP, Geographic location, FMS, storage) intended to feed the information required for the initialisation and administration of the server cluster 14.

This information firstly comprises data D(58), D(60,62), D(64,68) relating to the various networks of the server cluster 14: the administration network 60, 62 and the interconnection network 64, 68. This data relates for example to the type of network, the transmission capabilities thereof, a vendor ID, etc.

The information further comprises "node" data on the server type nodes of the server cluster 14 such as those connected to the primary control network 62: the nature of each node (computing, administration server, etc.), the technical characteristics thereof (model, hardware status, computing capability, RAM memory and status of the software tools installed), a vendor ID, etc.

The information also comprises "storage" description data on the storage infrastructure, on the logical volume partitioning, on the deployment models, etc.

It also comprises "MMI" data on the man-machine interface used by the server cluster 14, "EMS" data relating to the file management system used (for example, the Lustre system), "Deployment" data relating to the organisation of the deployment in the server cluster 14, "@IP" data relating to the IP address distribution in the cluster, and "Geographic location" data relating to the geographic location of the various elements.

To generate the database 72, i.e. to enter the values of the description data thereof, a method such as that wherein the steps are illustrated in FIG. 3 is advantageously used. This method is performed into two successive phases: a first phase 100 for pre-initialising the database 72 during which the "@IP" data is not entered (hence it is greyed out in FIG. 2), followed by a second phase 200 for assigning logical addresses to at least a portion of the connection ports of devices of the server cluster 14 during which the "@IP" data is entered. The first phase 100 is for example executed at least partially by the designer and vendor of the server cluster 14 whereas the second phase 200 may be executed by the user when the server cluster is installed on-site.

The first phase 100 starts with a step 102 for starting the initialisation of the database 72. During this first step 102, static data, defining a logical and geographic distribution of the devices of the cluster in the various networks thereof, and materially defining the devices of the cluster, is compiled and checked by an operator.

Conventionally, this data is available in digital file form, for example data tables generated using a spreadsheet. Indeed, these documents are generally obtained from a technical design phase following an invitation to tender and intended to define the precise architecture of the server cluster 14.

A first table 74, referred to as a logical representation table of the server cluster 14, comprises a list of the hardware and port-to-port interconnections forming the cluster accompanied by any information for identifying same uniquely as hardware and as elements of the cluster (in particular, this document assigns unique numbers for each node in the cluster, these numbers serving as suffixes for the identifiers).

A second table 76, referred to as the physical representation table of the server cluster 14, gives further information on devices of the server cluster, specifying the location thereof in a computing centre intended to receive the server cluster, for example using a system of coordinates, particularly specifying for each cable the length required and the catalogue reference number thereof, further indicating certain weight or location constraints, etc.

The check by the operator consists of ensuring that the fields of the tables 74 and 76 required for initialising the database 72 are indeed completed.

During a following step 104, the data in the tables 74 and 76 is automatically converted into handling queries of the database 72 of the server cluster 14 which are saved in a query file 80, during a step 110. This conversion of table type file data into queries is conventional and will not be described in detail.

During a step 112, an operator checks the result of the conversion of data into queries. At this stage, interaction is possible to edit the query file 80.

Finally, during a final step 114, this query file 80 is run by the administration server 18 on-site, when the server cluster 14 is installed and operational, so as to initialise the database 72. Nevertheless, although it is initialised using the tables 74 and 76, the database 72 is not yet suitable for administering the server cluster 14 since the logical addressing of the connection ports of devices of the server cluster 14 has not yet been carried out. The steps 102 to 112, and even optionally the step 114 envisaging an on-site deployment of the server cluster 14, may be performed by the cluster designer/vendor.

When the first phase 100 is complete, the second phase 200 starts with a step 202 for defining a logical addressing policy in respect of the connection ports of devices of the server cluster 14 and for generating a structured description file 82 of this logical addressing policy.

Taking the example of version 4 of the logical addressing IP protocol, an IP address of a connection port of a device of the cluster is defined by four bytes wherein the values are separated by dots, in the order starting with the most significant byte to the least significant byte. Assuming that this address is class C, the first three bytes define the server cluster as a local network and the final byte makes it possible to distribute theoretically 255 IP addresses to the connection ports of devices of the server cluster. If the server cluster comprises too may connection ports in relation to the addresses available in principle in class C, then the IP addresses thereof may be selected in class B thus enabling a more complex logical network configuration.

A logical addressing policy consists of predefining the rules for assigning available addresses. It comprises for example the following rules:
  selection of the addressing class according to the number of addresses to be distributed in the server cluster,
  prior allocation of some addresses for the switches of the administration network,
  prior allocation of some addresses for the switches of the compute node interconnection network,
  prior allocation of some addresses as virtual addresses of nodes identified by an alias when they are duplicated (this particularly applies to the processing interface 16, the administration server 18 and the management nodes 20 and 22),
  prior allocation of an address block, for the compute nodes interconnected in series,
  allocation of an IP subnet address to each of the three networks of the server cluster 14, etc.

Furthermore, the IP logical address distribution rules are clearly defined in the structured description file 82 of the logical addressing policy. It consists for example of a file in XML (eXtensible Markup Language) language format wherein a logical IP network configuration sought by the user of the server cluster 14 is defined in the form of a tree structure. Such a structure description format of a logical IP network configuration is particularly suitable for use by a networking expert.

A simple example of such a file 82 is provided in appendix 1. It comprises a primary or "interconnect" logical network consisting of two IP networks: one named "interconnect", occupying an IP subnet identified by the addresses 10.5.0.0/16 and of the "primary" type, i.e. directly associated with a physical network; the other named "ib-backbone", occupying an IP subnet identified by the addresses 10.2.34.0/23 and of the "secondary" type, i.e. indirectly associated with one or a plurality of physical networks.

Each IP network is then, at a higher hierarchical level of the tree structure, divided into IP address ranges.

For example, in the file 82 in appendix 1, the "interconnect" IP network comprises:
 a first range with first IP address 10.5.31.1, allocated to "mngt" and "mws" type nodes of the "Service_1" group,
 a second range with first address 10.5.32.7, allocated to "router" type "ib0" interface nodes and "mds" and "io" type "ib0" interface nodes of the "Service_1" group,
 a third range with first address 10.5.33.7, allocated to "router" type "ib2" interface nodes and "mds" and "io" type "ib1" interface nodes of the "Service_1" group,
 a fourth range with first IP address 10.5.34.1, allocated to "compute" type nodes of the "Service_interco" group,
 a fifth range with first IP address 10.5.36.1, allocated to "bmc" type "hwmanager" objects, and
 a sixth range with first IP address 10.5.60.1, allocated to "eth" type "switch" objects.

For example also, in the file 82 in appendix 1, the "ib-backbone" IP network comprises:
 a first range with first IP address 10.2.34.1, allocated to "compute" type nodes of the "Service_backbone" group, and
 a second range with first address 10.2.35.231, allocated to "gw_ip" type nodes.

As a more general rule, the file 82 consists of a hierarchical data tree wherein the structure may be based on the principles of the OSI (Open Systems Interconnection) model. In this way, for example, the root of the tree representing the logical network configuration defines the physical networks of the server cluster 14 complying with the characteristics of the "physical" layer of the OSI model. The second level of the tree defines the logical networks and the characteristics thereof corresponding to the characteristics of the "data link" and "network" layers of the OSI model (particularly characteristics for envisaging a division into IP address ranges and defining security settings). The third level of the tree defines the division of the logical networks into IP address ranges. The fourth level of the tree defines the classes of the devices of the server cluster 14. These classes are defined using a metalanguage for linking a device with the physical characteristics thereof. A device is defined by the model thereof, the name thereof, the characteristics thereof and the capability thereof of being registered with another device class. The information relating to classes is deduced from the physical information of the database 72. This fourth level of the tree assigns, to a device class, suitable for being sorted based on criteria (type, location, function), an IP address range defined in the third level of the tree.

The step 202 for generating the file 82 is followed by an execution of an automatic logical address allocator based on:
 the structured description file 82 of the logical addressing policy, and
 the content of the database 72 previously initialised during the step 114.

This automatic logical address allocator is for example an executable computer program receiving the file 82 and the database 72 as executing settings.

An example of a source file 84 of this computer program is provided in appendix 2, for a first part of the allocator having the function of applying the logical structure of one or a plurality of the IP networks defined in the structured description file 82 on each physical network defined in the initialised database 72. Merely for the purpose of illustration, the source file 84 first comprises a definition of the objects to be retrieved from the execution settings: the list of physical networks, the list of devices and the groups of devices defined by the client are retrieved from the initialised database 72; the IP address allocation rules are retrieved from the structured description file 82. It then comprises instructions for configuring the logical networks once the settings have been entered. These instructions are followed by a run through all the devices of the server cluster 14 as described in the database 72 to list the ports to be allocated or not (allocated port removal loop step). Finally, once the ports to be allocated are identified, the source file 84 comprising a checking and allocation loop intended to detect any possible IP address conflict or any overshoot of predefined ranges resulting from an application of the logical configuration on the physical networks of the server cluster 14 and allocate IP addresses to each connection port to be allocated. The execution of the source file 84 during a step 204 enables the creation of a command file which, when executed in a second part of the allocator, during a final step 206, runs commands in database management language, for example in SQL, to enrich the database 72 with the IP allocations carried out in the first part.

It is obvious that a method for assigning logical addresses such as that described above enables the user of a server cluster to define or complete his/her logical addressing policy with greater flexibility and greater freedom, since the information on logical networks to be applied on physical networks is generally specific to each user according to his/her structural and security constraints. Furthermore, following a network upgrade of the server cluster, for example by adding a network card to a node, or an extension of the server cluster, the automatic logical address allocator is capable of checking and reporting the inconsistencies liable to appear and applying the logical network configuration decided by the cluster administrator.

Moreover, it would be obvious to those skilled in the art that various modifications may be made to the embodiment described above, in the light of the teaching disclosed herein. In the claims hereinafter, the terms used should not be interpreted as limiting the claims to the embodiment disclosed in the present description, but should be interpreted to include any equivalents intended to be covered by the claims due to the wording thereof and which may be envisaged by those skilled by applying their general knowledge to the implementation of the teaching described above.

APPENDIX 1

File 82:

```
<network name="interconnect" function="ic">
  <logical_network name="interconnect" type="primary" subnet=
  "10.5.0.0/16" gateway="10.5.255.254" pkey="E8FF" >
    <range first_ip="10.5.32.1" >
      <member object="node" type="mngt" group="Service_1" />
      <member object="node" type="mws" group="Service_1" />
    </range>
    <range first_ip="10.5.32.7" >
      <member object="node" type="router" interface_name="ib0" />
      <member object="node" type="mds" group="Service_1"
      interface_name="ib0" />
      <member object="node" type="io" group="Service_1"
      interface_name="ib0" />
    </range>
    <range first_ip="10.5.33.7" >
      <member object="node" type="router" interface_name="ib2" />
      <member object="node" type="mds" group="Service_1"
      interface_name="ib1" />
      <member object="node" type="io" group="Service_1"
      interface_name="ib1" />
    </range>
    <range first_ip="10.5.34.1" >
      <member object="node" type="compute"
      group="Service_interco"/>
    </range>
    <range first_ip="10.5.36.1" >
      <member object="node" type="hwmanager" type="bmc"/>
    </range>
    <range first_ip="10.5.60.1" >
      <member object="switch" type="eth"/>
    </range>
  </logical_network>
  <logical_network name="ib-backbone" type="secondary"
  subnet="10.2.34.0/23" gateway="10.2.35.254" pkey="8132" >
    <range first_ip="10.2.34.1" >
      <member object="node" type="compute"
      group="Service_backbone" />
    </range>
    <range first_ip="10.2.35.231" >
      <member object="node" type="gw_ip" />
    </range>
  </logical_network>
</network>
```

APPENDIX 2

File 84 (first part):

```
New NetworkList nwl          /* List of physical networks */
New EquipmentList eql        /* List of devices */
New HWGroupList hwgl         /* Group of devices defined by client */
New AllocationRule alloc_rule  /* Allocation rules defined in file 82 */
alloc_rule=LoadRuleFromFile("/etc/networkmap.xml")
nwl= LoadNetworkListFromDB( )
eql= LoadEquipmentListFromDB( )
hwgl= LoadHWGroupListFromDB( )
alloc_rule->add_network(nwl)
alloc_rule->add_hwgl(hwgl)
alloc_rule->add_eql(eql)
/* Removal of allocated ports */
Foreach eq from eql
  Foreach netint from eq->get_interfaces( )
    if ( ! netint->is_allocated( ))
    then
      eq->remove_from_list(netint)
    fi
  Done
Done
/* IP check and allocation to non-allocated ports */
Foreach nw from nwl
  Foreach eq from eql
    Foreach int from eq->get_interface
      Foreach rule from alloc_rule
        if (rule->apply(nw,eq,int)
        then
```

APPENDIX 2-continued

File 84 (first part):

```
          rule->check_nextIP(nw)
          rule->allocate_ip(nw,int)
        fi
      Done
    Done
  Done
Done
```

The invention claimed is:

1. A method for assigning logical addresses to connection ports of devices of a server cluster, comprising the following steps:

in a first phase:

based on a logical distribution of the devices of the server cluster, a geographic distribution, and a hardware definition of the devices of the server cluster, initializing a server cluster administration database without assigning logical addresses to said connection ports of devices of the server cluster, wherein initializing the server cluster administration database includes translating data related to said logical distribution, said geographic distribution and said hardware definition into requests for managing the server cluster administration database, saving the requests and then executing the requests for completing the server cluster administration database;

in a second phase:

defining a logical addressing policy for said connection ports of devices of the server cluster;

according to the logical addressing policy, assigning logical addresses to said connection ports of devices of the server cluster using an automatic logical address allocator; and saving the logical addresses assigned in the server cluster administration database, wherein said automatic logical address allocator is configured to assign logical addresses based on execution settings comprising:

a structured description file of the logical addressing policy which includes a tree structure of logical networks and of logical address ranges in said logical networks; and content of the server cluster administration database obtained by executing the requests in the first phase after initializing the server cluster administration database in order to apply the tree structure of the structured description file on said obtained content for assigning the logical addresses to said connection ports of devices of the server cluster.

2. The method for assigning logical addresses according to claim 1, wherein the server cluster administration database includes, after its initialization, a list of physical networks that interlink said connection ports of devices of the server cluster; and wherein applying the tree structure of the structured description file to the content of the server cluster administration database after its initialization comprises applying the logical structure of at least one of the logical networks defined in the structured description file to each physical network defined in the server cluster administration database after its initialization.

3. The method for assigning logical addresses according to claim 1, wherein the tree structure is defined in XML format.

4. The method for assigning logical addresses according to claim 1, wherein the tree structure comprises:
   at a first root level corresponding to the "physical" layer of the OSI Open Systems Interconnection model, a description of physical networks of the server cluster;
   at a second level corresponding to the "data link" and "network" layers of the OSI Open Systems Interconnection model, a description of the logical networks of the server cluster;
   at a third level, a description of the division of these logical networks into logical address ranges; and
   at a fourth level, a class description of the devices of the server cluster and the associated logical address ranges thereof.

5. The method for assigning logical addresses according to claim 1, wherein the automatic logical address allocator is configured to configure the logical networks and generate a command file comprising instructions for allocating logical addresses to connection ports of devices of the server cluster, said instructions being expressed in database management language; and
   execute a command file based on the previously initialized administration database after its initialization.

6. The method for assigning logical addresses according to claim 5, further comprising:
   performing a loop check on all the connection ports to be allocated on the basis of consistency of the logical addressing policy defined in the structured description file with a physical structure of the server cluster.

7. The method for assigning logical addresses according to claim 1, wherein the logical addresses are IP addresses.

8. A server cluster comprising:
   a plurality of hardware nodes interconnected together by at least one data transmission network including at least one cluster node administration server; and
   an administration data storage array,
   an administration database including administration data stored in the administration data storage array,
   wherein the cluster node administration server comprises an automatic logical address allocator, and
   wherein said cluster node administration server is configured to
   in a first phase:
      based on a logical distribution of the devices of the plurality of devices in the server cluster, a geographic distribution, and a hardware definition of the devices, initialize the administration database without assigning logical addresses to said connection ports of devices of the plurality of nodes, wherein initializing the server cluster administration database includes translating data related to said logical distribution, said geographic distribution and said hardware definition into requests for managing the server cluster administration database, saving the requests and then executing the requests for completing the server cluster administration database;
   in a second phase:
      define a logical addressing policy for said connection ports of devices of the server cluster;
      according to the logical addressing policy, assigning logical addresses to said connection ports of devices of the plurality of nodes using said automatic logical address allocator; and
      saving the logical addresses assigned in the administration database,
      wherein said automatic logical address allocator is configured to assign logical addresses based on execution settings comprising
      a structured description file of the logical addressing policy which includes a tree structure of logical networks and of logical address ranges in said logical networks; and
      content of the administration database obtained by executing the requests in the first phase after initializing the server cluster administration database in order to apply the tree structure of the structured description file on said content for assigning the logical addresses to said connection ports of devices of the server cluster.

9. The server cluster according to claim 8, further comprising:
   a plurality of compute nodes; and
   at least one node configured to manage traffic associated with data processed by the plurality of compute nodes; and
   at least one data management node,
   wherein the data transmission network comprises at least one compute node interconnection network and at least one administration network different from the compute node interconnection network for connecting the cluster node administration server to the plurality of compute nodes and configured for managing the data traffic processed by the compute notes and managing data.

10. A non-transitory computer-readable medium upon which is embodied a sequence of programmable instructions which, when executed by one or more processors, causes said one or more processors to perform a method for assigning logical addresses to connection ports of devices of a server cluster, comprising:
   in a first phase:
      based on a logical distribution of the devices of the server cluster in the data transmission network, a geographic distribution, and a hardware definition of the devices of the server cluster, initializing a server cluster administration database without assigning logical addresses to said connection ports of devices of the server cluster, wherein initializing the server cluster administration database includes translating data related to said logical distribution, said geographic distribution and said hardware definition into requests for managing the server cluster administration database, saving the requests and then executing the requests for completing the server cluster administration database;
   in a second phase:
      defining a logical addressing policy for said connection ports of devices of the server cluster;
      according to the logical addressing policy, assigning logical addresses to said connection ports of devices of the server cluster using an automatic logical address allocator; and
      saving the logical addresses assigned in the server cluster administration database,
      wherein said automatic logical address allocator is configured to assign logical addresses based on execution settings comprising
      a structured description file of the logical addressing policy which includes a tree structure of logical networks and of logical address ranges in said logical networks; and content of the server cluster administration database obtained by executing the requests in the first phase after initializing the server cluster administration database in order to apply the tree structure of the structured description file on said obtained content for assigning the logical addresses to said connection ports of devices of the server cluster.

11. The non-transitory computer-readable medium according to claim 10,
wherein the server cluster administration database includes, after its initialization, a list of physical networks that interlink said connection ports of devices of the server cluster; and
wherein applying the tree structure of the structured description file to the content of the server cluster administration database after its initialization consists of applying the logical structure of at least one of the logical networks defined in the structured description file to each physical network defined in the server cluster administration database after its initialization.

12. The non-transitory computer-readable medium according to claim 10, wherein the tree structure is defined in XML format.

13. The non-transitory computer-readable medium according to claim 10, wherein the tree structure comprises:
at a first root level corresponding to the "physical" layer of the OSI Open Systems Interconnection model, a description of physical networks of the server cluster;
at a second level corresponding to the "data link" and "network" layers of the OSI Open Systems Interconnection model, a description of the logical networks of the server cluster;
at a third level, a description of the division of these logical networks into logical address ranges; and
at a fourth level, a class description of the devices of the server cluster and the associated logical address ranges thereof.

14. The non-transitory computer-readable medium according to claim 10, wherein the automatic logical address allocator is configured to
configure the logical networks and generate a command file comprising instructions for allocating logical addresses to connection ports of devices of the server cluster, said instructions being expressed in database management language; and
execute a command file based on the administration database after its initialization.

15. The non-transitory computer-readable medium according to claim 14, further comprising:
performing a loop check on all the connection ports to be allocated on the basis of consistency of the logical addressing policy defined in the structured description file with a physical structure of the server cluster.

16. The non-transitory computer-readable medium according to claim 10, wherein the logical addresses are IP addresses.

17. The server cluster according to claim 8,
wherein the tree structure comprises
at a first root level corresponding to the "physical" layer of the OSI Open Systems Interconnection model, a description of physical networks of the server cluster;
at a second level corresponding to the "data link" and "network" layers of the OSI Open Systems Interconnection model, a description of the logical networks of the server cluster;
at a third level, a description of the division of these logical networks into logical address ranges; and
at a fourth level, a class description of the devices of the server cluster and the associated logical address ranges thereof.

18. The server cluster according to claim 8, wherein the tree structure is defined in XML form.

19. The server cluster according to claim 8, wherein the automatic logical address allocator is configured to
configure the logical networks and generate a command file comprising instructions for allocating logical addresses to connection ports of devices of the server cluster, said instructions being expressed in database management language;
execute a command file based on the administration database after its initialization; and
perform a loop check on all the connection ports to be allocated on the basis of consistency of the logical addressing policy defined in the structured description file with a physical structure of the server cluster.

20. The server cluster according to claim 8, wherein the logical addresses are IP addresses.

* * * * *